No. 611,457. Patented Sept. 27, 1898.
J. W. McDONOUGH.
ART OF PRODUCING PHOTOGRAPHS IN COLOR.
(Application filed Dec. 28, 1894.)
(No Model.)

UNITED STATES PATENT OFFICE.

JAMES W. McDONOUGH, OF CHICAGO, ILLINOIS, ASSIGNOR, BY MESNE ASSIGNMENTS, TO THE INTERNATIONAL COLOR PHOTO COMPANY, OF JERSEY CITY, NEW JERSEY.

ART OF PRODUCING PHOTOGRAPHS IN COLOR.

SPECIFICATION forming part of Letters Patent No. 611,457, dated September 27, 1898.

Application filed December 28, 1894. Serial No. 533,198. (No specimens.)

*To all whom it may concern:*

Be it known that I, JAMES W. McDONOUGH, a citizen of the United States, residing at Chicago, Illinois, have invented certain new and useful Improvements in the Art of Producing Colored Pictures by the Aid of Photography, of which the following is a specification.

My improvements refer more generally to that part of the art known as printing, either mechanical or otherwise, than to those described in Letters Patent of the United States Nos. 471,186 and 471,187, issued to me March 22, 1892, although the common basis for the improvements described and claimed in my patents and herein are the same, the selective qualities of multicolored plates or screens upon the lights passing from an object to be photographed through them to the sensitized film in the camera and its subsequent development as a positive or negative.

Figure 1:
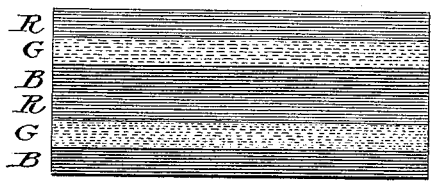
Figure 2:
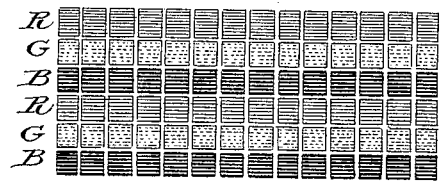
Figure 3:
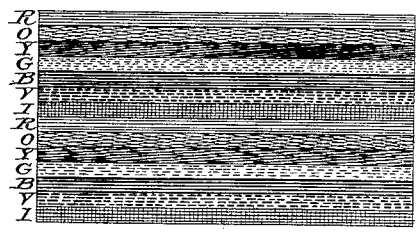
Figure 4:
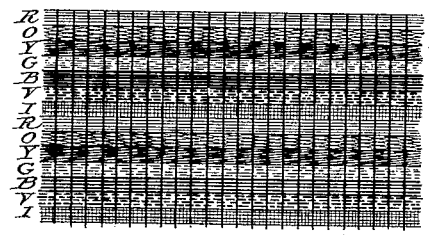
Figures 5, 6:
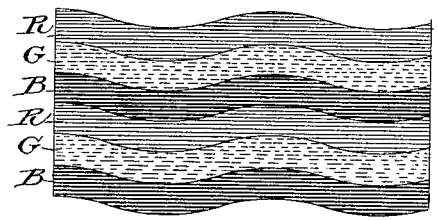
Figures 7, 8:
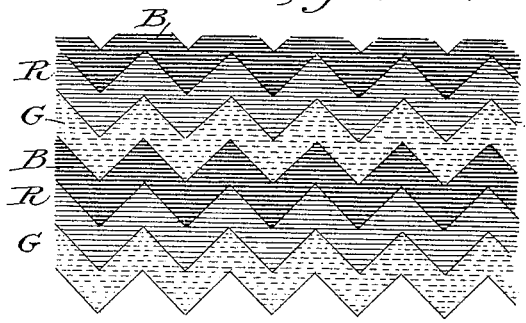

In the drawings, Figure 1 represents my invention when embodied in a plate having parallel alternating different-colored lines. Fig. 2 represents the same when the plate is provided with alternating lines of colored dots. Fig. 3 represents the same when the plate is provided with the seven primary colors of the spectrum recurring in their regular order of sequence. Fig. 4 represents the same as Fig. 3, with the addition of transverse black lines. Fig. 5 represents the same when the plate is provided with alternating red and blue lines, crossed transversely by yellow lines, forming with the red at the intersection orange dots or squares and with the blue green dots or squares. Fig. 6 represents the same as Fig. 1 except that the lines are arranged in waving or curved order. Fig. 7 represents the same when the plate is provided with a different arrangement of dots or squares from that shown in Fig. 2, and Fig. 8 represents the same when the plate is provided with alternating zigzag lines of different colors.

While I have represented in the drawings described above a number of different patterns in which my invention or process can be embodied, I desire it to be distinctly understood that I do not limit myself to these special patterns, as it will be apparent from the description of my invention and process, hereinafter given in detail, that the same can be embodied and carried out through an almost infinite variety of patterns or arrangement of the colors employed.

In making my improvements, including the process employed, I take a glass or celluloid plate, upon the face of which are deposited small particles of colored mediums—shellac, gelatin, or other medium—colored with anilin dyes to correspond with the fundamental colors of the spectrum—say reddish orange, yellowish green, and violet blue—or upon the face of which are ruled separate fine alternate lines in colors in the order of the spectrum, or upon the face of which are placed small alternated dots or squares in any manner sufficiently close to present to the eye a neutral surface. This plate may be varnished, or the screen may be built up of separate thin layers upon which a single color is lined or placed and then cemented together. The color of each is preferably of such depth as to absorb the kind of light transmitted by both the others. More than three colors in the dots or lines or figures may be used, such as the complementary colors red and green and blue and yellow, or the whole series of the spectrum. Such a mixture of colors placed side by side follows the laws of the mixture of lights and not of pigments.

I place the screen or plate in a photographic camera and in contact with an orthochromatic sensitized plate for the purpose of taking a negative and in such manner that the light from the object to be photographed shall pass through the multicolored screen. There are different grades and qualities of orthochromatic plates, and it is preferable to use such as are susceptible to the action of all the colors of the spectrum, or such as are needed in the picture to be taken. A plain colored screen may be used in connection with the multicolored screen to retard the action of some actinic rays that act more readily than others, or the depth of color, or the width of lines, or the size of dots or figures may be such as shall adapt themselves to different degrees of sensitiveness to actinism of the particular orthochromatic sensitized plate used.

The negative taken through a lined screen is in lines corresponding with the action of the colored light through the lines of the screen which do not absorb its particular color. In other words, blue light will act through the blue lines and be absorbed by its neighboring red and green lines, red through the red lines, &c. The sensitized film may be applied directly to the multicolored screen or plate and stripped off after development in the manner well known and used as a negative. I then make a corresponding multicolored plate of glass, opaque white celluloid, paper, or other material suitable for the purpose, upon which I place colored particles in dots or lines or figures corresponding to the first plate or screen, preferably of somewhat lighter tints or shades, but so as to register with such plate or screen in color and place. With the opaque paper or celluloid opaque printer's ink may be used instead of the transparent colors, and the light and color are reflected instead of transmitted. Lines are preferred on account of the facility of making them register, while dots or figures are preferred on account of the more even surface presented to the eye. The one or the other may therefore be used, according to the particular result sought to be accomplished. Lines, dots, or figures may be printed, placed, or ruled upon the paper or material used. These lines or particles follow the laws of stippling or true mixture of lights and present a surface white or neutral gray, according to the purity of the colors, cleanliness of mixture, and amount of light absorbed and reflected. This material I shall call "printing-paper," as the paper or other material, colored as described, may be covered with albumen or gelatin sensitized with silver and printed upon through the negative or by a metal or glass "half-tone plate" or type in a press with printer's ink.

For the purpose of printing on a mechanical press I make a photographic negative by means of the multicolored screen—say such a one as is ruled or printed in the alternated lines above, one hundred to the inch of each color, or three hundred to the inch of all—one colored line to transmit reddish orange, the next yellowish green, the next violet blue, and so on in alternation, or, in other words, an approximation to the recognized fundamental colors of the spectrum. This negative will be in lines opaque where the colored light has been transmitted and transparent where it has been absorbed. From this negative I make a metal or glass half-tone plate by any of the usual methods. This half-tone plate is divided on its surface by these manipulations in alternate raised lines, each corresponding to the amount of color absorbed by the colored lines of the screen or plate in the camera, or, in other words, to the non-action of light on the sensitized photographic plate, the depressions corresponding in width to the amount of light affecting the sensitized plate of the negative. A print taken from this half-tone plate upon white paper will show with black ink a lined black and white picture, or where dots and figures are used it will show a black and white picture corresponding to the pattern.

In order to print a colored picture, I take a sheet of printing-paper, as described heretofore, containing the colored lines, dots, or figures corresponding to the screen and negative and to which the half-tone printing-plate also corresponds in register, and print upon it, by means of the half-tone plate, a black or dark ink, making it register, so that the black ink will cover to its proper degree the colors which were absorbed in the camera by the compound colored plate or screen and leave uncovered or exposed those colors whose corresponding colors in the object to be photographed have impressed themselves upon the negative in the camera. The blacks are formed by the black ink, the whites by the combination of the colored lines, dots, or figures not covered by the ink and intermediate mixtures of colors by the combination of such colored lines, dots, or figures as are not entirely covered or obscured.

For convenience I will sometimes speak in the claims of the lines, dots, or figures as "patterns," intending to use the term in a sufficiently comprehensive sense to cover the uses of either way employed in such proportions, such degree of fineness, and such relative arrangement as to produce the results above described.

What I regard as new, and desire to secure by Letters Patent, is—

1. A transparent screen for use in taking and viewing a photograph bearing a pattern symmetrical as to a plane in the primary or approximately primary colors used, and in such dyes or pigments as have suitable selective light-absorption properties, substantially as described.

2. A screen or plate for photographic purposes provided with differently-colored substances arranged according to regularly-recurring patterns—as dots, lines, figures—of such colors and proportions as to cause each to absorb such colors as are transmitted by each and all the others, substantially as described.

3. A screen or plate for photographic purposes provided with differently-colored substances arranged according to regularly-recurring patterns—as dots, lines, figures—of such colors and proportions as to cause each to absorb such colors as are transmitted by each and all the others and transmit colors in inverse ratio to the actinic action of the colors on the sensitive photographic plate, substantially as described.

4. A screen or plate for photographic purposes having on its surface red, green and blue colored particles arranged according to regularly-recurring patterns—as dots, lines, figures—symmetrical as to a plane, substantially as described.

5. A screen or plate for photographic purposes having on its surface differently-colored substances corresponding to complementary colors of the spectrum, as red and green, blue and yellow, arranged according to regularly-recurring patterns—as dots, lines, figures—symmetrical as to a plane, substantially as described.

6. A white or light-colored material—as paper—bearing a pattern symmetrical as to a plane in the primary or approximately primary colors used, and in such dyes or pigments as have suitable selective light-absorption properties, substantially as described.

7. A white or light-colored material—as paper—provided with colored substances arranged according to regularly-recurring patterns—as dots, lines, figures—of such colors and proportions as to cause each to absorb such colors as are transmitted by each and all the others, substantially as described.

8. A white or light-colored material—as paper—provided with red, green and blue colored substances, arranged according to regularly-recurring patterns—as dots, lines, figures—symmetrical as to a plane, such colors being of such kinds and in such proportions as to present to the eye a white or neutral tint, substantially as described.

9. A white or light-colored material—as paper—provided with red, green and blue colored substances arranged according to regularly-recurring patterns—as dots, lines, figures—in regularly-recurring alternate order and symmetrical as to a plane, such colors being of such kinds and in such proportions as to present to the eye a white or light-colored neutral tint, the patterns being covered with a photographic sensitive material, substantially as described.

10. A white or light-colored material—as paper—provided with differently-colored substances corresponding to complementary colors of the spectrum, as red and green, blue and yellow, arranged according to regularly-recurring patterns—as dots, lines, figures—in regularly-recurring alternate order and symmetrical as to a plane, such colors being of such kinds and in such proportions as to present to the eye a white or light-colored neutral tint, the patterns being covered with a photographic sensitive material, substantially as described.

11. The process of making colored pictures, which consists in making a photographic negative in regular patterns—as dots, lines, figures—by the action of red, green and blue colored lights upon the sensitive plate in such patterns, then making therefrom a corresponding half-tone plate, printing type or surface, then printing from such printing-surface upon material prepared to correspond in colors and to register in form and dimensions with the patterns of colored lights acting upon the negative and with the patterns upon the printing-surface, whereby the colors corresponding to those that do not act upon the negative will be obscured or covered, while such proportion of colored patterns as corresponds to the action of colored lights upon the negative sensitized plate will be left visible, substantially as described.

12. The process of making colored pictures, which consists in printing upon a material prepared to correspond in colors and register in form and dimensions with the patterns of red, green and blue colored lights acting upon a negative, whereby the colors corresponding to those that do not act upon the negative will be obscured or covered, while such proportion of colored patterns as corresponds to the action of the colored lights upon the negative sensitized plate will be left visible, substantially as described.

13. The process of making colored pictures, which consists in covering or obscuring by means of a positive picture the colors upon a material prepared to correspond in color and to register in form and dimensions with the patterns of red, green and blue colored lights acting upon a negative, whereby the colors corresponding to those that do not act upon the negative will be obscured or covered, while such proportion of the colored patterns as corresponds to the action of colored lights upon the negative sensitized plate will be left visible, substantially as described.

JAMES W. McDONOUGH.

Witnesses:
THOMAS B. McGREGOR,
THOMAS F. SHERIDAN.